B. W. ALLIS.
COOKING UTENSIL.
APPLICATION FILED MAY 2, 1916.
1,273,119.
Patented July 23, 1918.
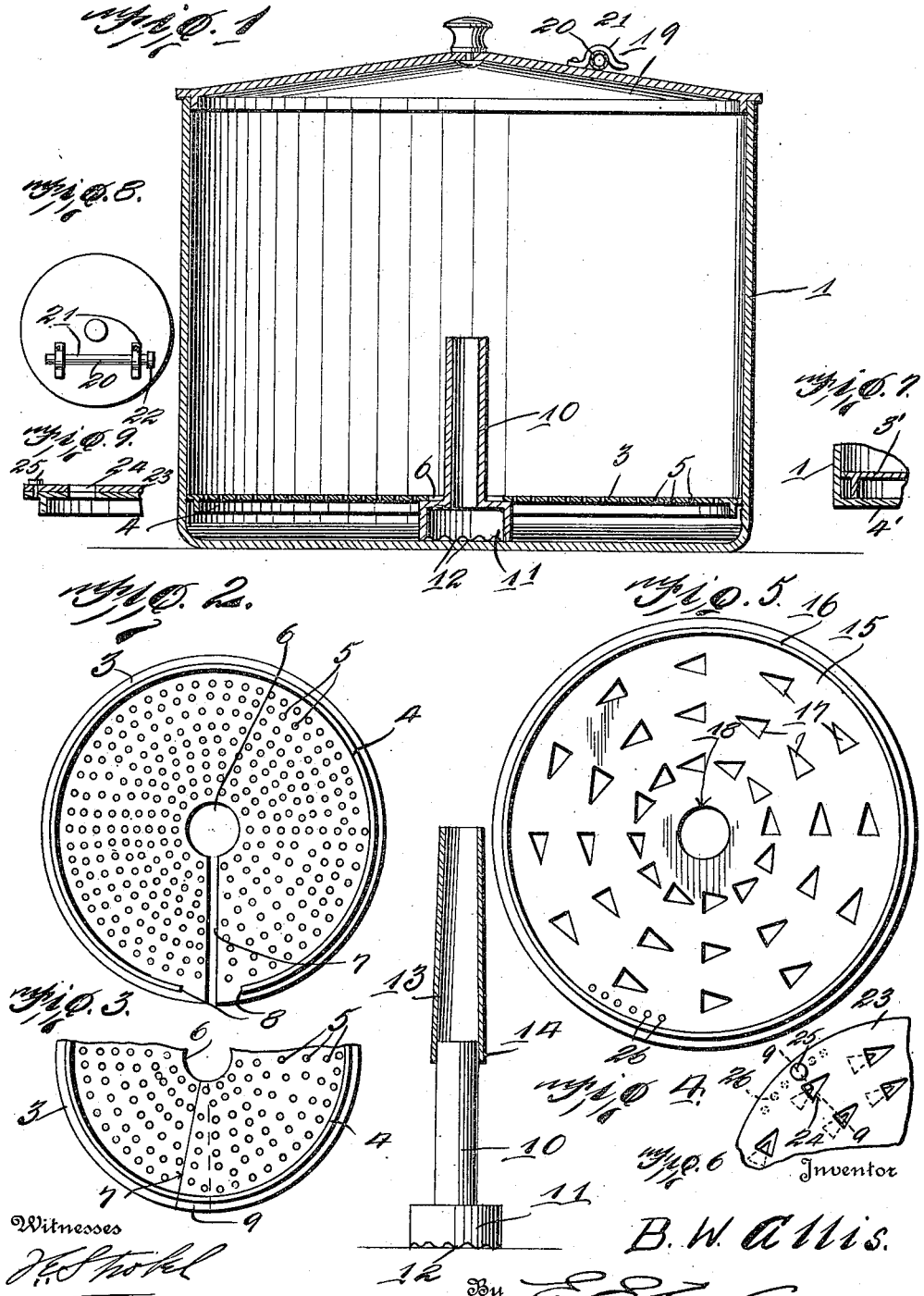

UNITED STATES PATENT OFFICE.

BURTON W. ALLIS, OF GARNETT, KANSAS.

COOKING UTENSIL.

1,273,119.      Specification of Letters Patent.      Patented July 23, 1918.

Application filed May 2, 1916. Serial No. 94,992.

*To all whom it may concern:*

Be it known that I, BURTON W. ALLIS, a citizen of the United States of America, residing at Garnett, in the county of Anderson and State of Kansas, have invented certain new and useful Improvements in Cooking Utensils, of which the following is a specification, reference being had therein to the accompanying drawing.

This invention relates to a detachable bottom for a kettle and is known as a cooking utensil. The principal object of the present invention is the production of a simple and efficient means for supporting the articles to be cooked in the kettle away from the bottom of the kettle so as to prevent the material from being burned and thereby produce an obnoxious action upon the metal from which the kettle is formed.

Another object of this invention is the production of a simple and efficient means for producing a detachable bottom which may be adjusted to suit the different sizes or forms of the kettle.

With these and other objects in view this invention consists of certain novel combinations, constructions, and arrangements of parts as will be hereinafter fully described and claimed.

In the accompanying drawing:—

Figure 1 is a vertical section through a kettle showing the invention applied thereto.

Fig. 2 is a bottom plan view of the detachable bottom.

Fig. 3 is a bottom plan view of a portion of the detachable bottom showing the same overlapped, illustrating the manner in which the size of the bottom supporting plate may be reduced.

Fig. 4 is a side elevation of the supporting member for the removable bottom showing an extension secured to the upper end thereof.

Fig. 5 is a bottom plan view of an embodiment of the false bottom used in connection with the present invention.

Fig. 6 is a top plan view of the disk shown in Fig. 5, showing an adjusting disk which may be secured upon the same for regulating the size of the drain apertures.

Fig. 7 is a vertical section through a portion of the kettle showing the draining plate and flange formed in one piece.

Fig. 8 is a top plan view of the cover.

Fig. 9 is a section taken on line 9—9, of Fig. 6.

By referring to the drawing it will be seen that a detachable or removable disk 3 is adapted to be seated within the bottom of the kettle 1, and is provided with a circumferential reinforcing flange 4 formed upon the under face thereof. This removable or detachable bottom 3 is provided with a plurality of minute perforations 5 which are slightly exaggerated in Fig. 2 to clearly illustrate the device. An enlarged centrally located aperture 6 is formed in the plate 3, and a radiating slot 7 diverges from the central opening 6 toward the edge of the plate 3 as illustrated in Fig. 2 of the drawing. The flange 4 terminates short of the slot 7 as indicated by the numeral 8 and it will, therefore, be seen that the plate 3 may have its edges 9 overlapped as clearly illustrated in Fig. 3 of the drawing to reduce the circumference of the plate 3 to accommodate the different size kettles within which the bottom may be placed. A hollow supporting standard 10 is placed in the bottom of the kettle and is provided with an enlarged head 11 having corrugated portions 12 formed upon the bottom to constitute a support for the standard 10. This standard 10 extends well up into the kettle so as to permit the bottom 3 to be removed from the kettle when so desired by grasping the upper end of the standard 10. A hollow extension 13 may be employed upon the standard 10, which hollow extension 13 is provided with an enlarged or outwardly flared end 14 to fit over the upper end of the standard 10. This structure is used when very deep kettles are employed for cooking.

In Fig. 5 there is shown an embodiment of the invention wherein a bottom plate 15 is employed having a circumferential flange 16 formed near the periphery thereof upon the under face. A plurality of V-shaped or diamond shaped notches 17 are formed in the plate 15 to permit water to easily pass through the plate, and a centrally located aperture 18 is formed in the plate 15 to permit the standard 10 to pass therethrough for the purpose of supporting the plate 15.

From the foregoing description it will be seen that a very simple and efficient device has been produced for supporting a false bottom in the lower end of the kettle so as to support a piece of meat or other articles of food above the bottom of the kettle in order that the articles may not be burned upon the bottom of the kettle 1. Should the water in the kettle fall below the bottom 3, the articles supported upon the bottom 3 will be supported in a spaced relation from the bottom of the kettle and thereby be prevented from burning.

As shown in Fig. 7, if it should be so desired the disk 3' may be formed of one piece with the flange 4' when metal is used which cannot be efficiently soldered. A gage glass 20 is adapted to be used in connection with the present device, and while not in use is supported upon the top of the cover 19 by means of the spring brackets 21. This gage glass 20 comprises an elongated hollow glass tube which may be provided with an asbestos band 22 around the top thereof to constitute a heat insulator therefor. When it is desired to ascertain the amount of water within the kettle, the operator may place the tube 20 within the kettle through the tube 13 and hollow standard 10 until the same touches the bottom, and by placing the finger over the upper end of the tube 20 and raising the tube out of the water, the amount of water within the kettle may be readily ascertained by viewing the gage. By releasing the finger from the upper end of the tube, the water will naturally fall therefrom.

As shown in Figs. 6 and 9 the disk 15 supports a top disk 23, which top disk 23 is provided with V-shaped apertures 24 similar to the apertures 17, and which apertures register with the apertures 17. A locking screw 25 is carried by the top disk 23 and is adapted to fit in one of the adjusting apertures 26 formed in the plate or disk 15 so as to permit the disk 23 to be rotated upon the disk 15 and adjusted to the desired position to regulate the size of the apertures formed in the plate. It should be understood that the size of the apertures may be regulated to accommodate the different substances or food which is being cooked in the kettle of larger capacity than of ordinary use.

Having thus described the invention what is claimed as new, is:—

In a device of the class described the combination with a kettle of a removable bottom plate, a hollow standard provided with a reduced neck, said standard provided with an enlarged lower end having a roughened lower edge resting upon the bottom of said kettle, said removable bottom plate provided with a centrally located aperture, said reduced neck extending through said aperture, said removable bottom resting upon said enlarged lower end and being supported thereby, and said bottom plate provided with a radiating slot for permitting the adjoining edges of said plate to overlap and accommodate itself to different sized kettles, and a hollow extension adapted to be mounted upon the upper end of said hollow reduced neck.

In testimony whereof I hereunto affix my signature.

BURTON W. ALLIS.

Copies of this patent may be obtained for five cents each, by addressing the "Commissioner of Patents, Washington, D. C."